Dec. 19, 1961    R. WEIGEL ET AL    3,013,805
BOAT TRAILER SKID ATTACHMENT
Filed April 7, 1958

INVENTORS
ROBERT WEIGEL
JOHN ALFRED WEIGEL
BY Alfred E. Miller
ATTORNEY

United States Patent Office 3,013,805
Patented Dec. 19, 1961

3,013,805
BOAT TRAILER SKID ATTACHMENT
Robert Weigel, 137 Willis Ave., and John Alfred Weigel, 414 Manhattan St., both of Hawthorne, N.Y.
Filed Apr. 7, 1958, Ser. No. 726,850
4 Claims. (Cl. 280—24)

This invention relates to an attachment for a boat trailer and more particularly to a universal skid attachment for conventional type boat trailers.

An object of the invention is to provide a detachable trailer skid which permits the hauling of outboard and inboard power boats from the water with a minimum of effort due to sliding contact of the skid attachment with the sand or dirt surfaces of the shoreline.

Another object of the present invention is the provision of boat trailer skid attachment having a front end angular in relation to the bottom surface thereof in order to permit the skid attachment to ride over rocks and uneven ground of the shoreline when the trailer is being pulled out of the water. In this connection, the front end may be either pointed or bow-shaped; or the front end may be a flat surface. It should be noted that the present skid constructed in accordance with the invention has a flat, relatively large bottom surface area which results in a sliding movement on the terrain that capitalizes on the vector component of force applied to the skid when pulling a boat trailer out of the water.

A further object of the present invention is to provide a skid which may be universally adapted to all types of conventional boat trailers.

Another object of the present invention is to provide a light weight skid attachment for boat trailers which is inexpensive to manufacture, easy to install, strong and durable, and is effective for the purposes intended.

The above and other features, objects and advantages of the present invention will be fully understood from the following description considered in connection with the accompanying illustrative drawings.

Figure 1:
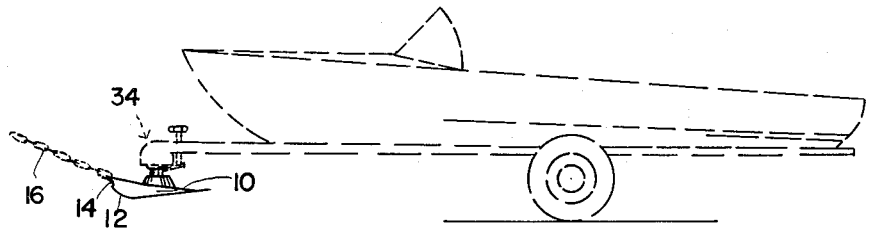
FIG. 1 is a side elevation view of the skid attachment embodying the invention illustrated in a connected position to a universal coupling of a boat trailer.
Figures 2, 2A:
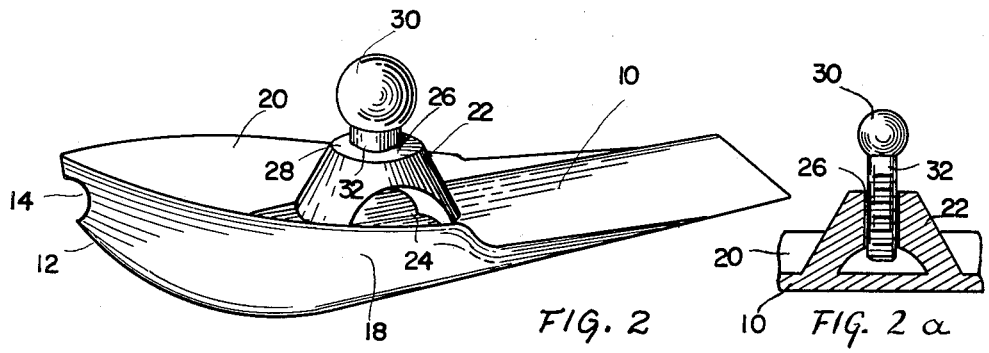
FIG. 2 is a perspective view of the skid attachment constructed in accordance with the present invention.
FIG. 2a is a sectional view taken through the means for attaching the skid attachment to a boat trailer.
Figures 3, 4:
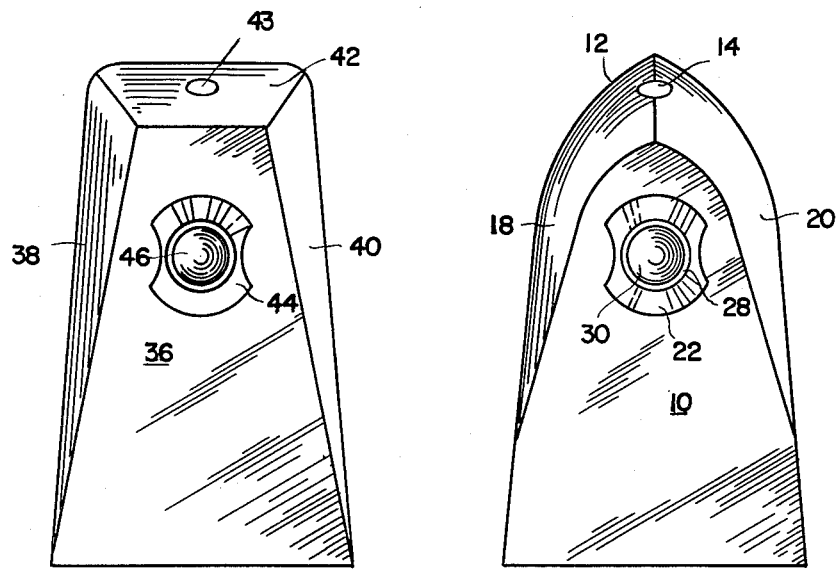
FIG. 3 is a top plan view thereof.
FIG. 4 is a top plan view of an alternate embodiment of the invention.

Referring more particularly to the drawings and especially to FIGS. 1–3 the present invention relates to a skid attachment for a boat trailer which may be manufactured of metal or synthetic resin and comprises a relatively flat bottom plate 10 and a front portion 12 sloped upwardly at an oblique angle relative to the bottom plate 10. The front portion is bow-shaped and is provided with an opening 14 for a length of chain 16. The skid attachment is also provided with upright sides 18 and 20 respectively. Upright sides 18 and 20 taper off sharply approximately at half of the length of the skid attachment. Mounted forward of the center of the skid attachment is the means for securing the skid attachment to a boat trailer coupling which constitutes a standard 22 fixed to the bottom plate 10 and having an archway 24 therethrough. Standard 22 is also provided with a threaded opening 26 in the top surface 28 thereof. As seen in FIG. 2a, a ball mount 30 provided with a partially threaded shank 32 is adapted to be screw-connected in the opening 26 of the standard 22. A conventional universal coupling referred to generally by the numeral 34 is illustrated in phantom in FIG. 1 and forms no part of the present invention. This type of coupling is a well-known device on present day boat trailers. It should be apparent that it is within the scope of the present invention to replace the ball 30 with balls of different diameters depending on the size of coupling utilized.

The present invention overcomes the disadvantages inherent in using a third small wheel at the forward part of a boat trailer for assisting in the hauling of boats out of water. The third wheel often became mired in mud or imbedded in soft sand while the present skid attachment is provided with a flat and relatively large bottom plate with a pointed forward end which slides over mud and wet sand as well as small rocks. Thus, the skid attachment coupled with a relatively long length of chain permits the free end of the chain to be secured to an automobile bumper with the automobile at a safe distance away from the shore line and on dry land whereby sufficient traction may be had to successfully pull boat trailers together with their load out of the water.

An alternative skid attachment construction is illustrated in FIG. 4 wherein is shown a device having a relatively flat bottom plate 36, sloping sides 38 and 40 respectively and a flat front end 42 which slants upwardly at an oblique angle relative to the bottom plate 36. An aperture 43 for a chain (not shown) appears in the front end 42. A standard 44 and a ball mount 46 constitutes the means for securing the skid attachment to a boat trailer attachment 34 such as shown in FIG. 1. The construction shown in FIG. 4 functions in the same manner as the device illustrated in FIGS. 1–3.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What we claim:

1. A skid attachment for a boat trailer comprising a dished-out member having a flat bottom plate and a front portion positioned at an oblique angle relative to said flat bottom plate, a standard mounted substantially vertically on said flat bottom plate provided with a top surface having a tapped opening therein, a ball mount having a threaded stud projecting therefrom whereby said ball mount may be removably inserted on said standard, said ball mount being adapted to removably attach said skid attachment to the forward end of said boat trailer.

2. A boat trailer comprising a cradle frame and pair of wheels, means mounting said wheels on said cradle frame, a skid attachment, a coupling means on the forward end of said cradle frame for connecting said skid attachment thereto, said skid attachment comprising a dished-out member having a flat bottom plate and a front portion positioned at an oblique angle relative to said flat bottom plate, and means on said member for removably connecting said skid attachment to said coupling means.

3. A boat trailer comprising a cradle frame and a pair of wheels, means mounting said wheels on said cradle frame, a skid attachment including a dished-out member having a flat bottom plate and a front portion positioned at an oblique angle relative to said flat bottom plate, a standard mounted substantially vertically on said flat bottom plate provided with a top surface with a tapped opening therein, a ball mount having a threaded stud projecting therefrom whereby said ball mount may be removably inserted on said standard, and coupling means on the forward end of said cradle frame for removably securing said ball mount to said cradle frame whereby said skid attachment is connected to said boat trailer.

4. For use with a trailer having a tongue carrying at its outer end the socket component of a ball and socket trailer hitch; a trailer skid comprising a base member having a bottom adapted to slide upon the ground, a vertically bored pedestal formed integral with the base member and projecting upwardly therefrom, a trailer hitch ball component mounted upon the upper end of the pedestal and projecting upwardly therefrom for universal attachment to the socket component carried by the trailer tongue, said hitch ball component including means cooperating with the bore in the pedestal for releasably securing the hitch ball component to the pedestal, and line attaching means on the base member at the forward end of the latter.

References Cited in the file of this patent

UNITED STATES PATENTS

| | | |
|---|---|---|
| 1,103,619 | O'Shaughnessy | July 14, 1914 |
| 1,544,965 | Bavousett | July 7, 1925 |
| 2,132,744 | McCraw | Oct. 11, 1938 |
| 2,458,209 | Sawatzki | Jan. 4, 1949 |
| 2,509,067 | Leach | May 23, 1950 |
| 2,528,890 | Lawrence | Nov. 7, 1950 |
| 2,723,130 | Andrews | Nov. 8, 1955 |